Patented July 29, 1947

2,424,895

UNITED STATES PATENT OFFICE 2,424,895

DENTAL IMPRESSION COMPOSITION

Stanley E. Noyes, Los Angeles, Calif.

No Drawing. Application October 30, 1942,
Serial No. 463,992

1 Claim. (Cl. 18—47)

This invention relates to a new dental impression compound and the method of producing the same.

For many dental purposes such as making of full dentures, partial dentures, bridges, etc., it is necessary for the dentist to be able to accurately reproduce portions of the mouth of the subject. Such reproductions often involve the duplication of undercuts of more or less severity, as for instance in the case where a tooth or teeth have been extracted and the adjacent teeth have crowded together.

For many years dental impressions have been taken with materials such as plaster of Paris, or various shellac or wax compositions. These materials have little or no elasticity and while it is not difficult to take some impressions with them, such as for most full dentures, it is not possible to reproduce accurately undercuts without either breaking the impression and re-assembling it as is done with plaster, or taking the impression in sections as is the practice in the use of shellac and wax compounds. The foregoing methods obviously involve time and there is the danger of inaccuracy, as well as discomfort to the patient.

By the use of an impression material which may be introduced in the mouth in a fluid or plastic condition and cooled to an elastic state, it is possible to take an impression which will accurately reproduce all details of the portion of the mouth under examination, and which due to its elasticity, can be removed from any undercuts present without losing the accuracy of the impression.

Due to the narrow range of temperature which the human mouth can stand, rather strict limitations are placed on the types of elastic materials which can be used. These materials must obviously be either fluid or plastic when they are seated to place in the mouth and must change by cooling to an elastic gel which will permit removal from the undercuts without permanent distortion. They must also either harden to a solid or be a sufficiently tough and rigid gel so that they may be used as molds for models of plaster or other compounds to be poured into them.

My dental impression material is composed of a suitable gel forming agent which may be obtained, for example, from the various marine algae including gigartina, chondrus, bladder wrack, kelp, gracilaria, or agar-agar. If the gel forming agent is alginic acid it may be converted into the form of a salt, as for example, sodium alginate, potassium alginate, ammonium alginate or mixtures thereof. The salts of alginic acid are used in the impression material to render the product elastic.

To the gel forming agent there is added a metallic oxide, such as litharge, which acts as a drying agent. Furthermore, the presence of the litharge permits plaster of Paris or dental stone to set against the walls of the final impression with a hard surface without impairing accuracy. Other metal oxides may also be employed, as for example zinc oxide, titanium oxide, lithium oxide, or calcium oxide, however, I prefer to use an oxide of lead, such as litharge.

To this composition there is also added a silicate, such as for example, sodium silicate or potassium silicate. The use of the alkali metal silicate is to lend strength to the impression material and also greatly assists in allowing the removal of the dental stone or plaster of Paris from the impression without sticking. These silicate salts also increase the keeping qualities, or "shelf life" of the product.

To this composition there is also added sodium phosphate, potassium phosphate or lithium phosphate. Normal phosphates or hexametaphosphates may be employed, however, I find sodium hexametaphosphate to be highly satisfactory. I may also add various carbonates, such as sodium, potassium, magnesium or calcium, to replace a part or all of the phosphate salts. To the above I may also add a filler, such as diatomaceous earth, montmorillonite, talc, silica gel, or activated alumina and calcium sulfate in the form of gypsum or plaster of Paris.

The following is a specific example of the dental impression material compounded from the above materials: 20 grams of sodium silicate and 10 grams of sodium hexametaphosphate are thoroughly mixed and then placed in an open vessel over a flame and heated until all of the combined moisture has been driven off. After cooling the dehydrated mass is pulverized to about 80 mesh size or smaller.

To 4 grams of the mixture of dehydrated and pulverized sodium hexametaphosphate and sodium silicate there is added 130 grams of filler, such as diatomaceous earth, 40 grams of litharge, 36 grams of potassium or sodium alginae and 30 grams of calcium sulphate.

The above mixture is then placed in a tumbling barrel and thoroughly mixed. It is important that all of the constituents comprising the foregoing mixture be finely ground. (80 mesh or smaller.) Furthermore, it is extremely important that during the mixing operation the temperature of the mixture does not rise substantially above normal room temperature, i. e., 65° F.–110° F., otherwise the ingredients react with one another and a worthless product is obtained. A tumbling barrel is highly satisfactory for the mixing operation. This device is made by mounting a shaft through the centers of the barrel ends and placing radial baffles on the inside of the barrel wall which are directed toward the shaft. The above mixture is placed in this device through a suitable opening in the end or side of the barrel. The tumbler is then rotated for a sufficient period to assure adequate mixing. The completely mixed or blended product is then withdrawn from the tumbler and packaged. In the mixing operation the ordinary ball mill has been found to generate sufficient heat to greatly impair the quality of the final product. Therefore, the ball mill should not be used for this purpose.

21 grams of the blended material withdrawn from the tumbler when thoroughly mixed with 50 grams of water results in the production of a creamy mixture which sets in a short time to an elastic gel. In practice this creamy mixture is placed in a dental tray which is placed in the mouth of the patient where it sets up in the form of the elastic gel in from three to six minutes. The setting time can be varied by varying the temperature of the water used. Cold water will retard the set and warm water will hasten it. This control can also be maintained by varying the amount of the powdered composition used in combination with water. The greater amount of powder used in relationship to the water the more time will be required to obtain the proper set.

An impression containing the above composition can be removed from the mouth after setting without breaking, tearing or distorting and will allow dental stone or plaster of Paris to set hard against its surface with extreme accuracy. This impression material also possesses the quality of not requiring a separating medium or fixing bath before pouring dental stone or plaster of Paris into the impression. Furthermore, it can be stored over a long period without deteriorating.

The specific mixture of ingredients set forth above in the example can be modified without departing from the spirit of the invention. For example, it has been found that the sodium silicate and sodium hexametaphosphate can be made into an aqueous solution prior to desiccation or dehydration. This solution is then evaporated to dryness and the solids obtained are heated sufficiently high to drive off or remove substantially all of the moisture present. Furthermore, as stated above, sodium carbonate, potassium carbonate, calcium carbonate or magnesium carbonate, may be mixed with the sodium silicate-sodium hexametaphosphate mixture to replace a portion or all of the phosphate. The addition of the carbonate does not change the method of compounding the impression material.

The sodium silicate used is the ordinary product of commerce which is fluid in character and contains about 40% of sodium silicate.

Furthermore, I do not wish to be limited to the specific amounts of materials which I have shown in the above example since the amounts of the ingredients may be varied considerably without impairing the quality of the product. For example, in the preparation of the silicate-phosphate mixture in the dehydration or desiccation step I may use 15 to 30 grams of the phosphate and 5 to 15 grams of the silicate with good results. Furthermore, in the final blend the phosphate-silicate mixture with the other ingredients I may use from 100–150 grams of filler, 25 to 50 grams of litharge, 30 to 45 grams of sodium alginate and from 25 to 50 grams of calcium sulphate.

I have also found that the calcium sulphate can be omitted completely from the final composition by treating the sodium alginate and litharge in the amount shown in the example in a pebble mill for twenty-four hours. After which this treated mass is then added to the mixture as shown in the example in place of the separate amounts of sodium alginate and litharge shown. Using the triturated sodium alginate-litharge mixture in the composition permits the omission of the calcium sulphate.

In some cases I find that the addition of small amounts of fluorsilicates of sodium, potassium, calcium, magnesium or manganese improves the quality of the final mixture.

I claim:

A method of producing a dental impression material comprising mixing a water soluble silicate with a metal phosphate and dehydrating this mixture at elevated temperature, grinding the dehydrated mixture to a particle size of at least 80 mesh and blending said dehydrated and ground mixture with a finely divided metal oxide and an alkali metal salt of alginic acid, said blending operation being carried out under such conditions that no substantial amount of heat is imparted to the mixture being blended.

STANLEY E. NOYES.

REFERENCES CITED

The following references are of record in the file of this patent:

UNITED STATES PATENTS

| Number | Name | Date |
|---|---|---|
| 2,165,680 | Stangenberg et al. | July 11, 1939 |
| 2,249,694 | Wilding | July 15, 1941 |
| 2,281,992 | Poetsche | May 5, 1942 |
| 2,298,835 | Noyes | Oct. 13, 1942 |
| 2,042,917 | Von Brandt | June 2, 1936 |